United States Patent [19]

Kanianthra

[11] Patent Number: 5,564,535
[45] Date of Patent: Oct. 15, 1996

[54] SIDE IMPACT ENERGY ABSORBER

[75] Inventor: Joseph N. Kanianthra, Reston, Va.

[73] Assignee: United States of America, Washington, D.C.

[21] Appl. No.: 413,551

[22] Filed: Mar. 28, 1995

[51] Int. Cl.⁶ .................................................. B60R 21/04
[52] U.S. Cl. ..................... 188/371; 280/751; 267/118; 293/110
[58] Field of Search ........................ 188/371, 372, 188/377; 267/116–118; 293/107, 110, 134; 296/146.6; 280/757

[56] References Cited

U.S. PATENT DOCUMENTS

| | | | |
|---|---|---|---|
| 3,554,527 | 1/1971 | Hall | 267/116 |
| 3,810,668 | 5/1974 | Kornhauser | 293/110 |
| 3,844,581 | 10/1974 | Fox | 280/751 |
| 3,906,222 | 8/1975 | Muller | 293/110 |
| 5,141,279 | 8/1992 | Weller | 280/751 |
| 5,306,066 | 4/1994 | Saathoff | 280/751 |
| 5,356,177 | 10/1994 | Weller | 280/751 |

*Primary Examiner*—Robert J. Oberleitner
*Assistant Examiner*—Chris Schwartz
*Attorney, Agent, or Firm*—Otto M. Wildensteiner

[57] ABSTRACT

A shock absorbing pad, preferably for the interior of a vehicle, comprising a series of interconnected fluid reservoirs in the form of spheres partially filled with a fluid. Below a certain level of impact the shock is absorbed as the fluid is forced from one sphere into one or more of the other spheres. Above that level the spheres rupture, thereby absorbing the shock.

9 Claims, 4 Drawing Sheets

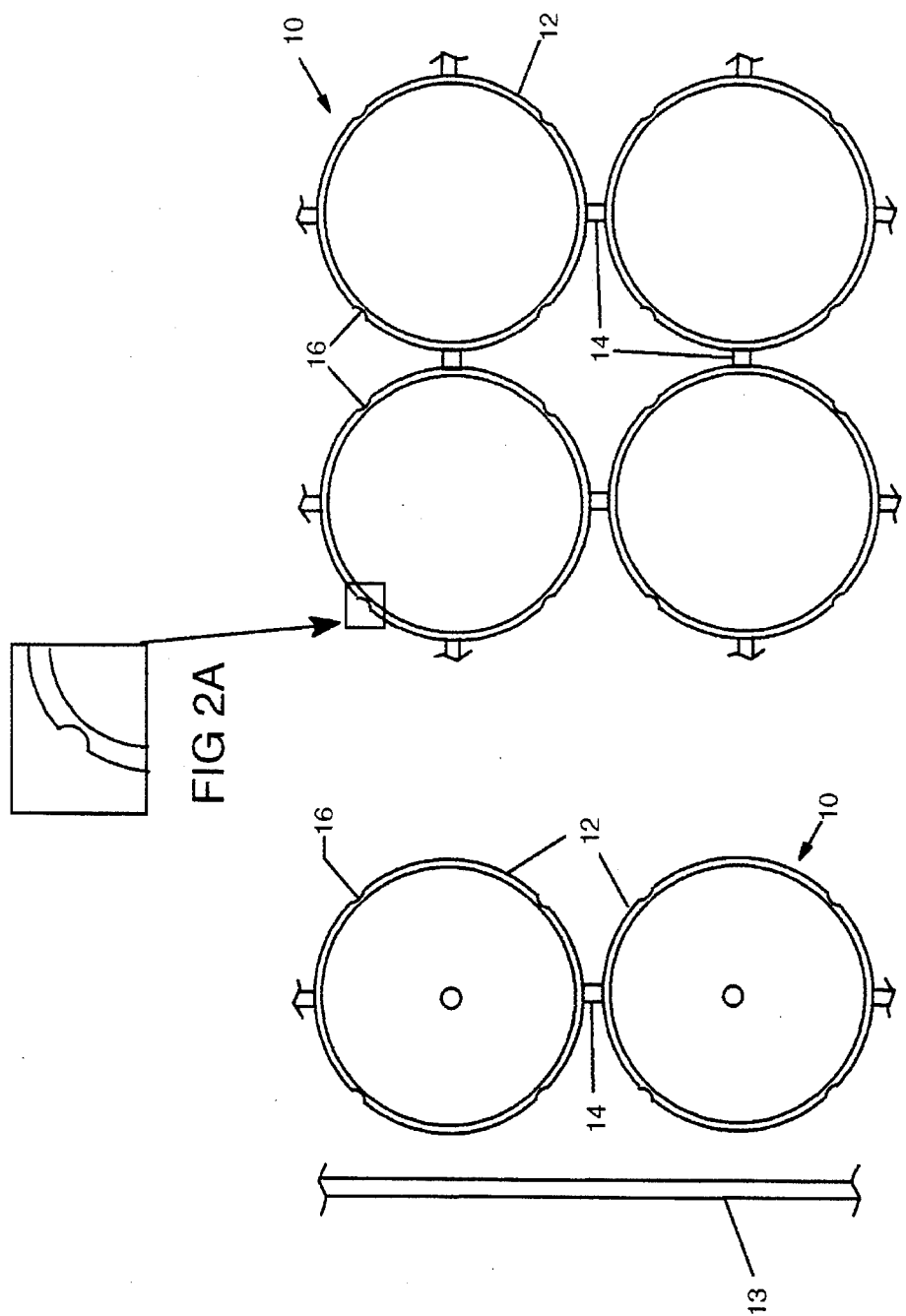

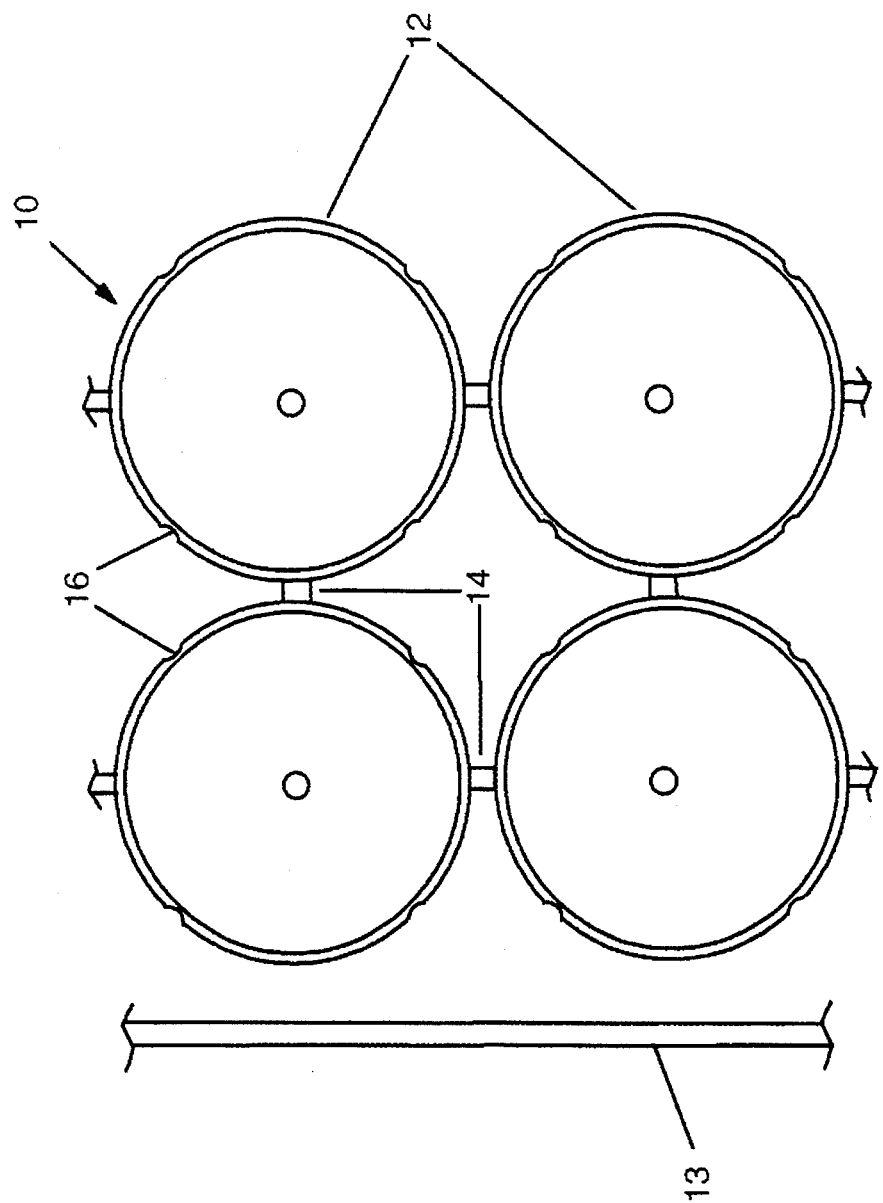

SIDE IMPACT ENERGY ABSORBER

STATEMENT OF GOVERNMENT INTEREST

The present invention may be made or used by or on behalf of the Government of the United States without the payment of any royalties thereon or therefor.

BACKGROUND

An analysis by the National Highway Traffic Safety Administration (NHTSA) of the fatality and injury statistics of passenger car occupants involved in side impact crashes led to the conclusion that the bulk of the crashes were vehicle to vehicle side impacts, rather than side impacts with stationary objects. It also showed that head injuries are the most frequent source of fatalities, followed by chest and abdominal injuries. A similar analysis of non-fatal side crashes showed that over 24,000 serious injuries occur annually. It is estimated that over 50 percent of these serious injuries result from impacts with the side interior and side hardware/armrests in passenger cars.

Automobile manufacturers have generally made structural changes to varying degrees and added energy absorbing padding in their passenger cars. However, it was found that structural modifications alone had little or no effect in reducing the injury measurements obtained in baseline vehicle tests, although there are studies that show that such modifications reduce the injury measurements on crash dummies. (These crash dummy tests are made with a moving deformable barrier simulating another vehicle striking the test vehicle.) NHTSA simulation studies have shown that structural stiffness and padding characteristics are important parameters that affect thoracic and pelvic injuries. A number of vehicle design characteristics such as the thickness of the door at occupant contact regions, stiffness of pillar-floor attachments, etc. also have a marked influence on dummy-measured injury parameters.

Even though researchers have differences of opinion on the mechanisms that produce injury in side crashes, the commonly held belief is that as the striking vehicle or barrier momentum is transferred to the target vehicle door, the door structure collapses inward with the inner panel striking the stationary occupant at a velocity that could range theoretically anywhere from the velocity change experienced by the center of gravity of the struck vehicle to the velocity of the striking vehicle or barrier. In most side crashes, this contact velocity of the door against the occupant's chest and pelvis in many production passenger cars is estimated to be as much as 12–15 kph (8–10 mph) less than the average lateral impact velocity of 50 kph (30 mph) of the striking vehicle. In order to minimize the thoracic injury potential, it is important to limit the contact velocity of the door interior against the occupant's chest. If the occupant comes in contact with the collapsing door as the door decelerates, one would expect the door-chest contact velocity to be lower. On the other hand, if the door strikes the occupant's chest as its velocity is being ramped up, and at or near the peak door velocity, the severity of the impact would be higher.

The lower contact velocity can be achieved by either locating the occupant as far away from the door as possible so that the door had begun decelerating prior to occupant contact, or by ensuring that the door offers enough resistance to sudden collapse so that it does not "punch" the occupant. Spacing the occupant away from the door to achieve a lower contact velocity is not a practical proposition in today's vehicles which have limited side crush space available in their basic design. Therefore, the only available practical means to achieve the objective of limiting the contact velocity, thereby transferring less energy to the occupant, is to make structural enhancements to slow the door down. Efficient management of the crash energy by dissipating it in the door would also reduce the chest and pelvic injury potential.

From the above discussion, it is clear that both structural improvements and providing energy absorbing materials such as padding to cushion the impact within the door are necessary to improve side impact safety performance in passenger cars. Some researchers have argued that the net effect of providing padding between the door and occupant for side impact protection could be an increased energy transfer to the occupant. They have argued that when padding is present, the occupant is contacted by the inner door surface earlier than when no padding is present. However, it is believed that it is possible to judiciously select the energy absorbing material so as to lower the energy transfer that takes place from the door to the occupant in a controlled fashion, and it is erroneous to theorize that any type of cushioning would necessarily result in higher thoracic injury levels because of earlier and hence increased energy transfer.

The design of a cushioning element for side impact protection depends on assumed impact conditions such as the impact velocity of the door and its mass, the contact area, the reaction surface characteristics, the available crush distance, and the surrounding structural compliance.

Customarily used energy absorbing materials can be grouped into three broad categories: resilient materials, quasi-resilient materials, and non-resilient materials. Resilient materials are designed to repeatedly absorb smaller amounts of energy over a reasonable period of time; quasi-resilient materials remain substantially resilient under small displacements, but under large distortions do not recover completely. Non-resilient materials, which do not recover, are generally suited for one-time absorption of very large amounts of energy. Open celled plastic foams, such as polyurethane and polyethylene foam, and rubberized materials fall into the resilient category, while fiberboard structures and plastic foams such as polyurethane, polystyrene, and polyethylene as well as rubbers of higher density than that of the resilient type are typical candidate quasi-resilient materials. Suitable non-resilient materials include paper and aluminum honeycomb sheets. Polyurethane and polyethylene foams are in both the resilient and quasi-resilient categories. As their densities increase they lose resiliency, hence the category a given foam is in depends on its density.

It would appear that for vehicle applications the most suitable are the quasi-resilient and the nonresilient type materials, the former for head impact protection in contacts against upper interior structures such as pillars, and the latter for side impact protection of the thorax. Both of the above types of materials can be easily formed into shapes and incorporated into various vehicle component designs. For those components which are most likely to be exposed to bumps and occupant contacts in everyday use, it would be preferable to use non-resilient materials. The initial peak stress and the energy absorbed in these materials are largely a function of overall material density. On the other hand, honeycomb is generally strain-rate insensitive at velocities of interest for vehicle applications. Therefore, the energy absorption characteristics of such materials are likely to approach those of ideal padding. Thus what is needed is a padding material or system which has a high initial energy absorption ability and which will continue to absorb energy at a high rate.

OBJECTS

Accordingly, it is an object of the present invention to provide a means of absorbing energy at a high initial rate and a high sustained rate after initial impact.

It is a further object of the present invention to provide such means of absorbing energy in a size and type that can be placed inside a vehicle.

It is a further object of the present invention to provide such a means of absorbing energy in a weight that can be placed in a vehicle door.

It is a further object of the present invention to provide such a means of absorbing energy that is inexpensive to fabricate and install in a vehicle door.

SUMMARY

Briefly, the present invention is a relatively flexible sheet of fluid reservoirs in the form of hollow spheres or bubbles that are partially filled with hydraulic fluid and are interconnected with one another. The sheet is placed for example on the inside of a vehicle door in order to provide side impact protection for the occupants of the vehicle. When the occupants of the vehicle contact the spheres, the hydraulic fluid is forced from one sphere into one or more of the other spheres, thereby absorbing the energy of the impact. For a given fluid viscosity, the rate of energy absorption can be varied by varying the size of the interconnecting passages and or size of the spheres. Further, the spheres can have weakened portions on their peripheries so that they rupture in the event of an extremely hard impact.

BRIEF DESCRIPTION OF THE DRAWINGS

FIG. 1 shows a side view of the spheres in relation to the door of the vehicle in which they are installed.

FIG. 2 shows the spheres as they are arranged against the side of the door.

FIG. 2a shows an enlarged view of weakened portions 16.

FIG. 3 shows a configuration comprising two sheets of spheres.

DESCRIPTION OF THE PREFERRED EMBODIMENT

Figure 4:
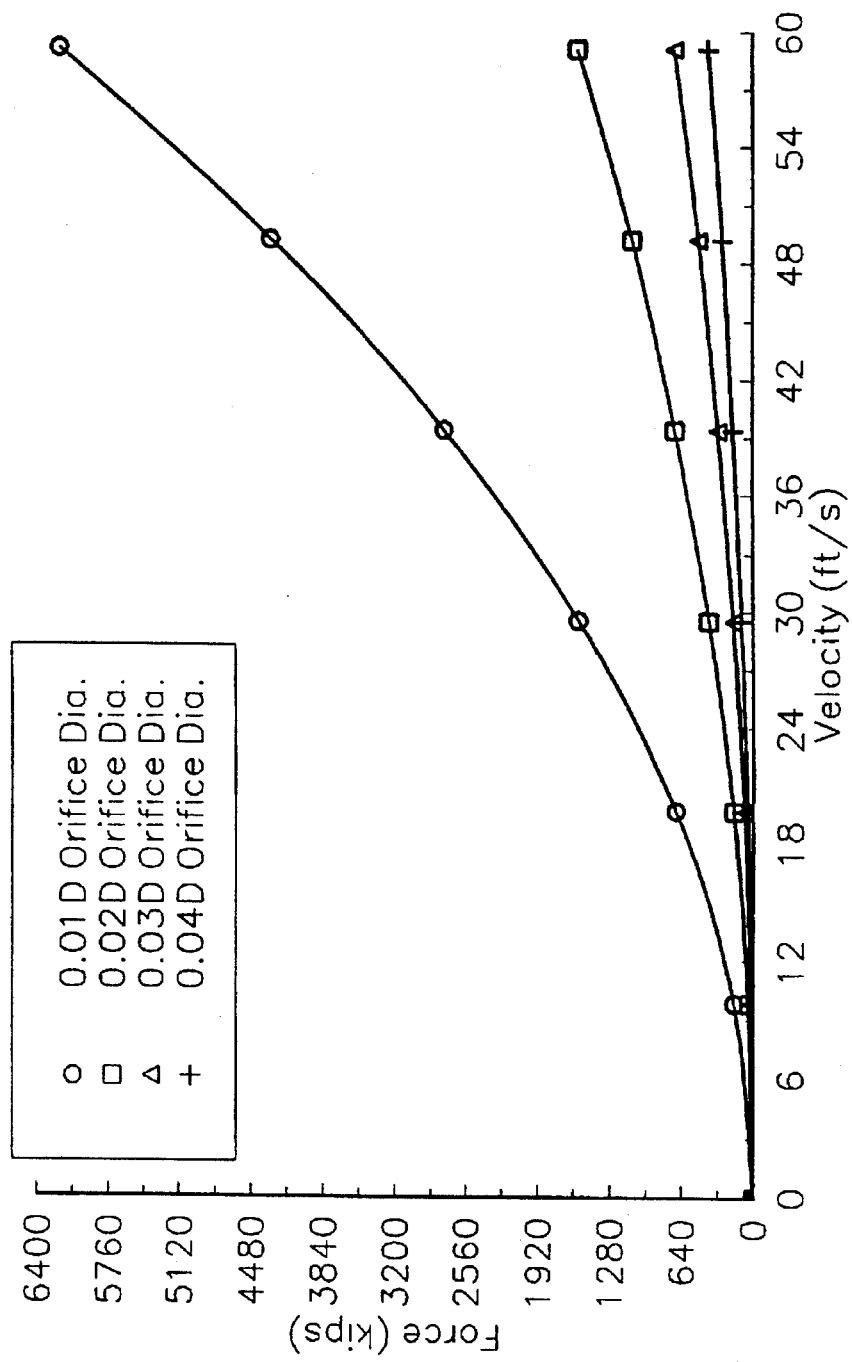
FIG. 4 shows the relationship between the amount of force absorbed and the size of the capillary tubes.

As shown in FIGS. 1 and 2, the shock absorbing pad 10 of the present invention comprises a series of fluid reservoirs, preferably in the shape of hollow spheres 12, that are interconnected by capillary tubes 14. The preferred shape is spherical because when pad 10 is subjected to impact the stresses are equally divided over the entire sphere, with no weak points (except for the deliberately introduced rupture points 16). This allows spheres 12 to be designed to rupture at a known, repeatable impact pressure.

FIG. 1 shows spheres 12 placed on the inside of a vehicle door 13; however, they could be placed anywhere it is desired to absorb the force of an impact.

Spheres 12 are partially filled with fluid; the degree of filling is from 50% to 90%. The reason for not filling them completely is to leave room for the fluid that is displaced from other spheres in an impact. The viscosity of the fluid is not particularly critical as long as the fluid flow remains in the laminar regime, and, so long as it is matched to the size of the capillary tubes that interconnect the spheres. A fluid that is too viscous for the size of the capillary tubes would not flow readily through the tubes under a slight impact. This would cause the pad to appear "stiff", which would increase the peak force of impact that is transmitted to the occupant of the vehicle that strikes (or is struck by) the pad. Conversely, a fluid that is not viscous enough would flow through the tubes too readily without absorbing enough energy. This would make the pad appear "soft", and it would collapse quickly enough to allow the hard structure of the vehicle to strike the occupant. The desired relationship is one that allows the spheres to quickly absorb the initial force of the impact, and then keep on absorbing at this level for as long as there is contact between the interior and the occupant. This relationship allows the spheres to absorb the most energy, thereby providing the most protection for the vehicle's occupants. Likewise, the chemical formula of the fluid is not critical as long as the fluid does not change its viscosity over time or with temperature changes and is compatible with the material of the reservoirs. Suitable fluids include conventional hydraulic fluid and ethylene glycol, as well as other fluids.

It is anticipated that any fluid having a viscosity in the range of 17–36 centistokes would be suitable for use in the present invention, provided that it met the other requirements (i.e. relatively constant viscosity over the temperature range the inside of a vehicle is exposed to, chemically stable over time, etc.). Suitable examples include SAE 40 weight motor oil or SAE 140 weight gear oil.

For a reservoir diameter in the range of 1 to 2 inches and a capillary diameter of 0.1 to 0.2 inches, the Reynolds numbers for the above fluids having kinematic viscosities in the range of 17–36 centistokes (0.000183–0.000387 $ft^2$/sec) are approximately 700–1100 for the estimated velocities of flow through the capillaries in the event of an impact. Thus the flow through the capillaries is laminar, which is desired.

The spheres and capillaries can be made of any material which is compatible with the fluid and which does not deteriorate with age or substantially change physical properties with temperature. Suitable materials include polyethylene or polycarbonate butadiene styrene blend (PC ABS blend).

The fact that tubes 14 are of capillary size only also means that the fluid in them will not flow down to the bottom reservoirs. That is, all of spheres 12 will remain only partially filled rather than having all of the bottom spheres completely filled and the top spheres empty.

Rupture points 16 are placed on the spheres to allow them to rupture in extreme impacts. If a crash is severe enough, the sudden contact with the occupant will be more than can be absorbed by the fluid being displaced from the spheres. If the spheres did not rupture, they would be almost as stiff as the hard structure of the vehicle. By designing them to rupture at a certain stress level, they absorb some of the impact when they rupture and thus provide some protection. Further, if the person's body initially contacts only a single sphere and causes it to rupture, the impact will then probably be spread out to at least some of the spheres surrounding the one that ruptured. If this is the case, those spheres could then perhaps absorb the impact in the intended manner.

FIG. 4 shows the relationship between the amount of force developed and the size of the capillary tubes as a function of the size of the capillary for a given fluid. The diameters of the capillary tubes are a function of the diameter D of the spherical reservoirs. As shown, as the size of the capillary tube is increased the amount of energy absorbed by the pad is reduced. This is because the fluid is able to move through the tubes more easily, and the spheres consequently collapse more quickly. FIG. 4 also shows that the absorption of the pad is non-linear. That is, as the speed of impact increases the pad can absorb proportionally more impact than at a lower speed. This is probably due to the fact that as the speed of flow of the fluid through the capillaries increases due to the harder impact, the resistance to the flow due to turbulence, etc. also increases. As is to be expected, this is most pronounced at smaller capillary tube sizes.

The impact absorber of the present invention could also be made in two or more layers, as shown in FIG. 3, with the spheres of the layers being of the same or different diameters. It could also be designed so that the inner layer (i.e. the layer closest to the occupants) is "softer" and absorbs less severe impacts. In the event of a very severe impact, the inner layer would collapse or rupture after absorbing part of the impact, then the forces would be transferred to the outer layers which are progressively "stiffer", and absorb progressively greater amounts of impact energy.

FIG. 3 shows the spheres of the two layers being interconnected with each other. However, the two layers of spheres could be independent of each other.

Figure 5:
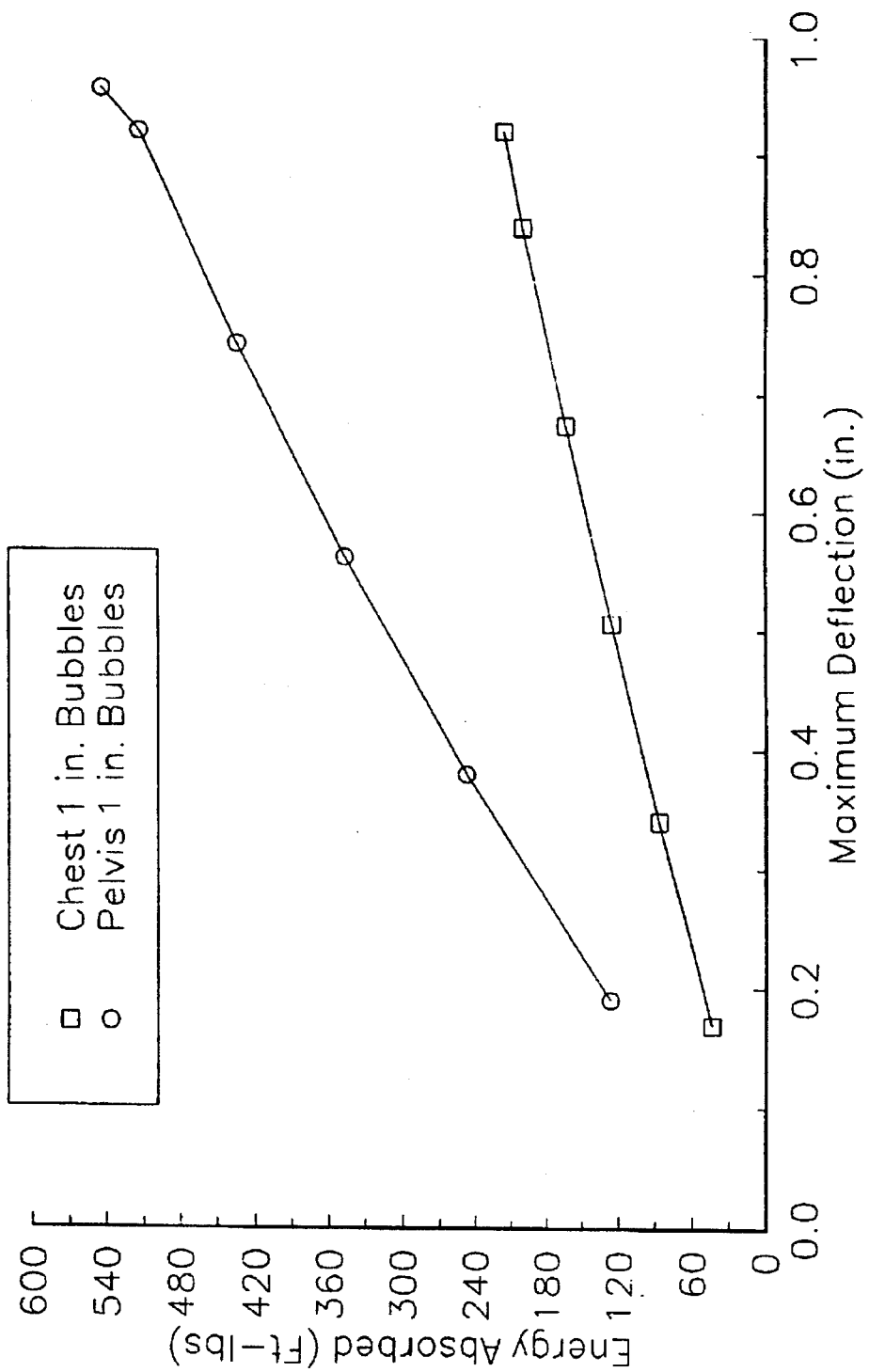
FIG. 5 shows the variation in calculated energy absorption at chest and pelvis levels with variation in capillary tube size.

FIG. 5 shows the energy absorbed plotted against maximum deflection for a first pad having 1 inch diameter bubbles at pelvis level, and a second pad also having 1 inch diameter bubbles but mounted at chest level. A computer simulation of a side crash allowed calculation of the energy absorbed by this arrangement at maximum deflection of the pads, as the capillary tube size is varied for each pad. As the pads are allowed to deflect more and more by increasing the tube size, the energy absorbed increases in a non-linear fashion for both pads. Ultimately, as the pads begin to bottom out because the capillary tube no longer resists the free flow of the fluid out of the sphere, the energy being absorbed falls off. The different energy absorption rates for the pelvis and chest pads are not only dependent on the padding characteristics, but also on the vehicle structure on which the padding is mounted, its bearing surface, and the stiffness characteristics of the body parts of the occupant which interact with the pads. In the computer model, the inner door panel characteristics are not the same for the upper and lower door. Further, the lower part of the door is being struck by the stiffer bumper of the striking vehicle. These differences cause dissimilar loads to be applied by the door to the chest and the pelvis, thus causing different energy absorption levels in the two pads.

I claim:

1. An impact absorber for a vehicle comprising a plurality of fluid reservoirs formed of a relatively flexible material and fluidly communicating with one another;

said reservoirs being arranged in a generally planar sheet and provided with at least one weakened portion on the periphery of each of said plurality of fluid reservoirs so that said reservoirs rupture upon a known impact pressure.

2. An impact absorber as in claim 1 including a second generally planar arrangement of hollow interconnected partially filled fluid reservoirs.

3. An impact absorber as in claim 2 wherein said second generally planar arrangement of reservoirs is interconnected with said first generally planar arrangement of reservoirs.

4. An impact absorber as in claim 1 wherein said fluid reservoirs are in the form of hollow spheres.

5. An impact absorber as in claim 4 wherein said hollow spheres have a diameter of approximately 2.5 cm, the spheres are interconnected by passages having a diameter of approximately 0.075 cm, and the fluid has a viscosity of approximately 17.8 centistokes.

6. An impact absorber as in claim 1 wherein said reservoirs have a diameter of approximately 2.5 cm, the interconnecting passages have a diameter of approximately 0.075 cm, and the fluid has a viscosity of approximately 17.8 centistokes.

7. An impact absorber as in claim 4 wherein said hollow spheres are placed on the inside of a vehicle.

8. A method of using an impact absorber to absorb the force on the occupants of a vehicle upon an impact which comprises;

providing a sheet of a plurality of fluid reservoirs;

providing a weakened portion on the periphery of each of said plurality of reservoirs so that they rupture at a known impact pressure;

interconnecting said reservoirs to allow fluid transfer between said reservoirs in the event of contact with said reservoirs by an occupant of the vehicle;

partially filling said reservoirs with a fluid;

providing said plurality of fluid filled reservoirs on at least a portion of the inside of the vehicle.

9. The method of claim 8 further comprising providing an additional generally planar sheet of said interconnected reservoirs next to the first planar sheet.

\* \* \* \* \*